March 31, 1931.  R. TVESTMANN  1,798,640

WORKHOLDER

Filed June 20, 1929

Rudolf Tvestmann Inventor

By his Attorney
Ivan E. A. Konigsberg

Patented Mar. 31, 1931

1,798,640

UNITED STATES PATENT OFFICE

RUDOLF TVESTMANN, OF NEW YORK, N. Y., ASSIGNOR TO E. LEITZ, INC., A CORPORATION OF NEW YORK

WORKHOLDER

Application filed June 20, 1929. Serial No. 372,234.

This invention relates to improvements in work holders of the type used for seizing and holding small specimens, for instance for grinding and polishing purposes, or for laboratory work.

More particularly this invention relates to a work holder of the type disclosed in my pending application filed October 10th, 1928, Serial Number 311,449 for improvements in polishing machines.

The object of this invention is to provide an improved work holder consisting of but few parts and easily operated. With this object in view my invention is embodied in a work holder constructed as hereinafter set forth and as illustrated in the accompanying drawing in which—

Figure 1:
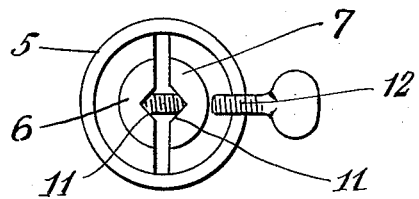
Fig. 1 is a plan view of the work holder.

The holder comprises a barrel 5 and two symmetrical co-operating semi-circular elongated jaws 6 and 7 having a pivotal edge 8 which divides each jaw into a larger upper portion 9 and a smaller lower portion 10. The jaws are longer than the barrel and are cut angularly as at 11, 11 to enable them to seize the work. A screw 12 is threaded in one of the jaws and engages the other jaw to force the upper ends of the jaws apart, and the lower ends of the jaws together to seize a specimen or work.

Figure 2:
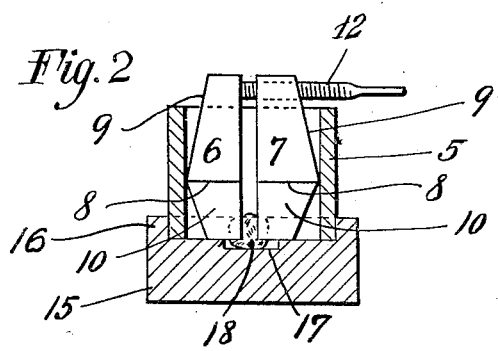
Fig. 2 is a side view partly in section showing how the work is mounted in the holder.

The work holder is used in combination with a stage in mounting a specimen. As seen in Figure 2, the reference numeral 15 denotes a stage having an annular flange 16 and a centrally disposed recess or socket 17.

The specimen 18 is laid in the socket, the barrel put on the stage within the flange 16 and the two jaws placed within the barrel. Then the screw is operated and causes the jaws to move or rock on their pivotal edges 8 to seize and clamp the work, and at the same time the jaws are self-locking within the barrel. When the screw is screwed outwards, the workholder parts come apart and the work is released.

Figure 3:
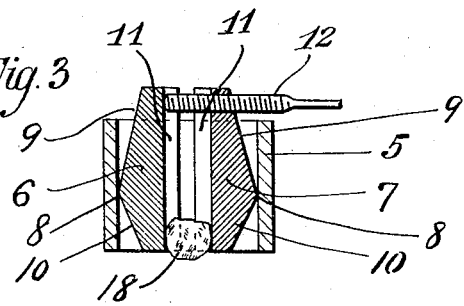
Fig. 3 is a sectional view of the holder with the work.

Figure 3 shows the work holder with the work 18 firmly held by the jaws. The holder may now be suitably mounted in the machine or device which is to act or work on the specimen.

It will be noted that the work holder comprises but four parts and is of extremely simple construction. The stage provides a very convenient means for mounting the work because the work may be accurately centered and the projecting portion accurately gaged by the depth of the recess. The flange 16 may have a larger inside diameter than the outside diameter of the barrel, but preferably these two diameters are the same.

I claim:

1. A work holder of the character described comprising a barrel, a pair of jaws within said barrel, each of said jaws contacting with the inner wall of the barrel and adapted to oscillate thereon at the contacting point and a screw for forcing one end of the jaws apart to cause the other end of the jaws to seize the work between them and for locking said jaws within the barrel.

2. A work holder of the character described comprising a barrel, a pair of jaws loosely placed within the barrel, each of said jaws having a pivot portion formed thereon to contact with the inner wall of the barrel and a screw mounted in one of the jaws for forcing the jaws apart to cause them to seize the work between them and for locking the jaws within the barrel.

3. A work holder of the character described comprising a barrel, a pair of opposed elongated symmetrical jaws placed within the barrel disconnected from each other and from the said barrel, said jaws having pivot portion in pivotal relation with the wall of the barrel and a screw for causing said jaws to seize the work between them and for locking the jaws within the barrel.

4. A work holder of the character described comprising a barrel, a pair of jaws placed within the barrel disconnected from each other and from the barrel, said jaws having pivot portions contacting with the wall of the barrel and means mounted in one of the jaws for causing said jaws to be locked within the barrel and seize the work between them.

5. A work holder of the character described comprising a barrel, a pair of co-operating symmetrical jaws placed loosely within the barrel, one end of said jaws projecting above the barrel, said jaws having a pivot portion intermediate their ends in contact with the wall of the barrel and a screw for causing the jaws to seize the work between them and for locking the jaws and the work within the barrel.

6. A work holder of the character described comprising a barrel, a pair of jaws placed within the barrel, each of said jaws being semi-cylindrical and having tapering ends whereby to form a pivotal edge intermediate the jaw ends and a screw adapted to operate said jaws to move on their pivotal edges in engagement with the inner wall of the barrel whereby to cause the jaws to seize the work and become locked with the barrel.

7. A work holder of the character described comprising a barrel, a pair of jaws within the same, means for operating the jaws to seize the work and lock them within the barrel, in combination with a stage for mounting the work and consisting of a body for supporting the barrel and the jaws, said body having a recess centrally of the first named recess to receive the work projecting below said jaws.

RUDOLF TVESTMANN.